(12) United States Patent
Wheeler

(10) Patent No.: US 9,994,163 B2
(45) Date of Patent: Jun. 12, 2018

(54) FRONT BUMPER FOR UTV

(71) Applicant: Ryde Industries, LLC, Rockwall, TX (US)

(72) Inventor: Lance David Wheeler, Rockwall, TX (US)

(73) Assignee: Ryde Industries, LLC, Rockwall, TX (US)

( * ) Notice: Subject to any disclaimer, the term of this patent is extended or adjusted under 35 U.S.C. 154(b) by 0 days. days.

(21) Appl. No.: 15/148,042

(22) Filed: May 6, 2016

(65) Prior Publication Data
US 2016/0325700 A1 Nov. 10, 2016

Related U.S. Application Data

(60) Provisional application No. 62/158,041, filed on May 7, 2015.

(51) Int. Cl.
*B60R 19/03* (2006.01)
*B60R 11/06* (2006.01)
*B60R 19/48* (2006.01)

(52) U.S. Cl.
CPC .............. *B60R 11/06* (2013.01); *B60R 19/48* (2013.01)

(58) Field of Classification Search
CPC ...... B60R 2021/23382; B60R 21/2338; B60R 21/233; B60R 21/2165; B60R 3/02; B60R 9/00; B62D 33/0273; B60P 3/40; B60P 1/435
USPC .................................................... 296/100.02
See application file for complete search history.

(56) References Cited

U.S. PATENT DOCUMENTS

| | | | | |
|---|---|---|---|---|
| 2,880,016 A | * | 3/1959 | Peterson | B60D 1/54 280/482 |
| 4,040,498 A | * | 8/1977 | Johnson | B60K 11/04 180/68.6 |
| 4,057,125 A | | 11/1977 | Kroft | |
| 4,099,760 A | * | 7/1978 | Mascotte | B60R 19/52 224/402 |
| 4,125,214 A | * | 11/1978 | Penn | B60R 9/06 224/508 |
| 4,215,496 A | * | 8/1980 | Wehr | E01H 5/06 172/817 |
| 4,411,461 A | * | 10/1983 | Rosenberg | B60R 9/06 211/17 |
| 4,753,447 A | * | 6/1988 | Hall | B60R 3/007 182/127 |
| 4,989,765 A | * | 2/1991 | Huebner | B60R 9/06 224/42.24 |
| 5,000,473 A | | 3/1991 | Johnson | |
| 5,326,142 A | * | 7/1994 | Dodds | B60Q 1/2611 180/68.6 |

(Continued)

*Primary Examiner* — Kiran B Patel
(74) *Attorney, Agent, or Firm* — Shannon W. Bates; Harper Bates & Champion LLP (57) ABSTRACT

A front bumper for a utility vehicle ("UTV") may couple to the front of the UTV. The front bumper may include a cargo platform for providing additional cargo space to the UTV and for segregating items stored on the front bumper from items stored in the passenger area and/or a cargo bed on the back of the UTV. The front bumper may include a tool exchange system designed to store and hold various tools and equipment on the UTV, such as fishing poles, guns and chainsaws. An attachment rod may be used to couple the tool exchange system to the front bumper.

15 Claims, 7 Drawing Sheets

(56) References Cited

U.S. PATENT DOCUMENTS

| | | | |
|---|---|---|---|
| 5,364,142 A | 11/1994 | Coiner | |
| 5,381,939 A * | 1/1995 | Tippets | B60R 9/04 224/309 |
| 5,467,910 A | 11/1995 | Ritter et al. | |
| 5,544,799 A * | 8/1996 | Didlake | B60R 9/06 224/282 |
| 5,586,702 A * | 12/1996 | Sadler | B60R 9/06 224/281 |
| 5,680,976 A * | 10/1997 | Koliopoulos | B60R 9/06 224/282 |
| 5,823,585 A * | 10/1998 | Tanguay | B60R 19/48 293/106 |
| 5,996,869 A * | 12/1999 | Belinky | B60R 9/06 116/28 R |
| 6,006,973 A * | 12/1999 | Belinky | B60R 9/06 224/500 |
| 6,039,228 A * | 3/2000 | Stein | B60R 9/06 211/193 |
| 6,290,271 B1 * | 9/2001 | Geisler | B60R 19/52 293/115 |
| 6,447,032 B1 | 9/2002 | Howell, Sr. | |
| 6,575,509 B1 * | 6/2003 | Golden | B60R 19/38 293/106 |
| 6,598,914 B1 * | 7/2003 | Dixon | B60K 11/04 293/106 |
| 6,682,085 B2 * | 1/2004 | Furuhashi | B60R 3/002 182/150 |
| 6,874,590 B2 * | 4/2005 | Rondeau | B62K 5/01 180/89.1 |
| 6,979,016 B1 * | 12/2005 | Wegener | B60D 3/00 280/495 |
| 7,090,267 B2 * | 8/2006 | Pendarvis | B60R 19/24 293/133 |
| 7,134,702 B2 * | 11/2006 | Takahashi | B60Q 1/0433 224/401 |
| 7,306,270 B2 | 12/2007 | Helms et al. | |
| 7,325,848 B2 | 2/2008 | Joseph et al. | |
| 7,743,864 B2 * | 6/2010 | Tweet | B60N 2/24 180/312 |
| 7,753,293 B2 * | 7/2010 | Farmer | A01C 17/001 111/11 |
| 7,762,510 B2 | 7/2010 | Eller | |
| 8,109,556 B2 * | 2/2012 | Bergman | B60R 19/52 180/90.6 |
| 8,388,038 B2 | 3/2013 | Hastings | |
| 8,414,052 B2 | 4/2013 | Vertanen | |
| 8,764,080 B2 | 7/2014 | Hardy et al. | |
| 8,905,463 B2 * | 12/2014 | Kuhne | B60R 19/12 293/133 |
| 2004/0041415 A1 * | 3/2004 | Hamm | B62D 49/04 293/115 |
| 2004/0096305 A1 * | 5/2004 | Shubert | B60P 3/125 414/563 |
| 2005/0158161 A1 * | 7/2005 | Shubert | B60P 3/125 414/563 |
| 2005/0158162 A1 * | 7/2005 | Shubert | B60P 3/125 414/563 |
| 2005/0199671 A1 * | 9/2005 | Riley | B60R 9/06 224/512 |
| 2006/0011754 A1 * | 1/2006 | Farmer | B60R 9/00 239/722 |
| 2006/0237502 A1 * | 10/2006 | Tweet | B62D 31/003 224/401 |
| 2007/0069534 A1 * | 3/2007 | Morrill | B60R 9/10 293/117 |
| 2008/0012365 A1 | 1/2008 | Harvey | |
| 2008/0292435 A1 | 11/2008 | Turner et al. | |
| 2010/0078455 A1 * | 4/2010 | Murray | B60R 9/06 224/488 |
| 2012/0217078 A1 * | 8/2012 | Kinsman | B60R 21/13 180/69.4 |
| 2014/0291370 A1 * | 10/2014 | Donnigan | B60R 9/08 224/502 |
| 2015/0083769 A1 * | 3/2015 | Williams | B60R 9/10 224/488 |

* cited by examiner

Figure 6

FRONT BUMPER FOR UTV

CROSS-REFERENCE TO RELATED APPLICATIONS

This application claims the benefit of U.S. Provisional Patent Application Ser. No. 62/158,041 filed May 7, 2015, and entitled "Front Bumper for UTV", which is incorporated herein by reference in its entirety.

TECHNICAL FIELD

The present disclosure relates to apparatus for providing additional cargo space, and/or for carrying tools and equipment, on a utility vehicle ("UTV").

BACKGROUND

Utility vehicles (UTVs) are generally small, four-wheel drive vehicles designed for off-road operation. UTVs are typically used as work vehicles on farms, ranches, industrial plants, and the like, or as sports vehicles for hunting, fishing, camping, etc. UTVs are available in a variety of sizes to transport two or more passengers, plus cargo.

In some implementations, UTVs may include no extra cargo space beyond the passenger area. In other implementations, UTVs may be equipped with a small cargo bed in the back of the vehicle, providing some limited storage space.

SUMMARY

The present disclosure relates to apparatus for providing additional cargo space, and/or for carrying tools and equipment, on a UTV.

In some implementations, the apparatus may comprise a front bumper that couples to the front of a UTV. The front bumper may include a front cargo platform for providing additional cargo space to the UTV and for segregating items stored on the front bumper from items stored in the passenger area and/or on the back cargo bed.

The front bumper may further comprise one or more tool exchange systems designed to store and hold various types of tools and equipment on the UTV. Attachment rods may couple the tool exchange systems to the front bumper.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawings, in which.

Like reference symbols in the various drawings indicate like elements.

DETAILED DESCRIPTION

Embodiments of the present disclosure generally provide apparatus for providing additional cargo space, and/or for carrying tools and equipment, on a UTV. The apparatus may comprise a front bumper for a UTV comprising a plurality of different features and components. In certain embodiments, the present disclosure may provide a front bumper for a UTV configured with a tool exchange system.

Figure 1:
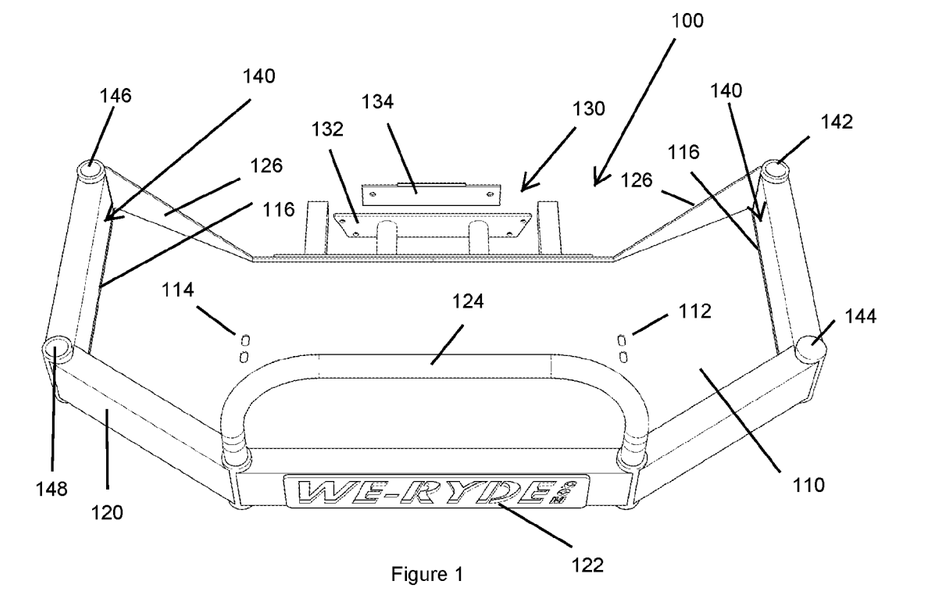
FIG. 1 illustrates a top perspective view of an implementation of a front bumper for a UTV according to the present disclosure.
Figure 2:
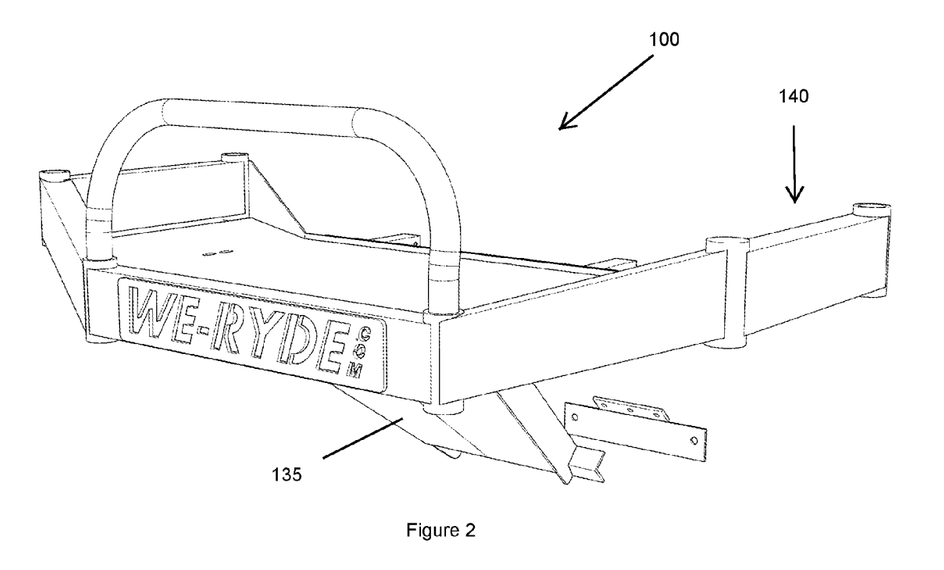
FIG. 2 illustrates a side perspective view of the front bumper of FIG. 1.

FIGS. 1 and 2 depict a top view and a side perspective view, respectively, of a front bumper 100 for a UTV, according to the present disclosure. The front bumper 100 is operable to expand the storage space of the UTV, and to provide a separate cargo area for segregating items stored on the front bumper 100 from items stored in the passenger area and/or on the back cargo bed of the UTV. Having the extra storage space provided by the front bumper 100 is especially helpful when the back cargo bed of the UTV is loaded with items that need to be segregated from other items; such as segregating equipment like gun cases and foldable chairs away from a hunter's kill.

The front bumper 100 may comprise a cargo platform 110 having a plurality of tie-down holes 112, 114 for receiving straps to connect cargo (such as a cooler, a hunter's kill, tools or other equipment) to the platform 110. In an implementation, the cargo platform 110 is formed from a laser cut 14-gauge piece of sheet metal.

When a cooler is stored in the back cargo bed of a conventional UTV, the cooler can take up more than half of the space provided. End users of UTVs regularly carry coolers, whether to store their food and beverages, the fish that they caught on their trip, or bait to set in traps. Thus, a cooler is a big part of the UTV lifestyle. The cargo platform 110 of the present disclosure allows the end user to stow a cooler in the front of the UTV, leaving the back cargo bed open for other items.

The front bumper 100 may further comprise a rail 120 surrounding the platform 110 to maintain cargo therein. In an implementation, the front and sides of the rail 120 are formed of 2-inch by 4-inch, 14-gauge rectangular tubing, and the angled back band 126 portions are laser cut, 11-gauge steel.

In some implementations, one or more wash out slots 116 may be provided between the cargo platform 110 and the rail 120 to allow a user to wash off mud and other debris through the wash out slots 116 that may accumulate on the cargo platform 110 during use. In an implementation, the wash out slots 116 are approximately 18-inches long and approximately ¼-inch tall.

Figure 5:
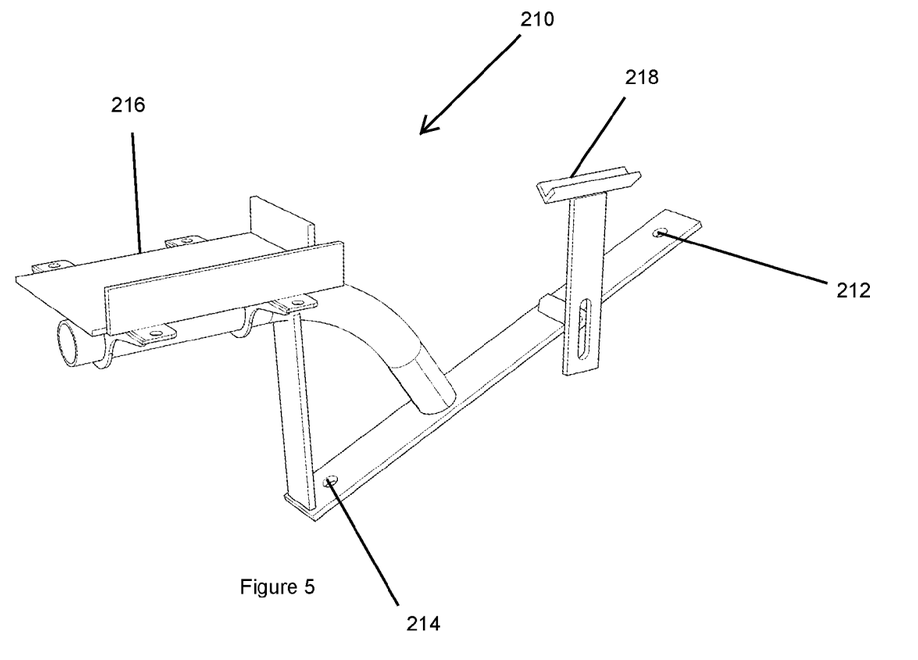
FIG. 5 illustrates a side perspective view of an implementation of a tool exchange system for mounting a chainsaw to a front bumper of a UTV according to the present disclosure.
Figure 6:
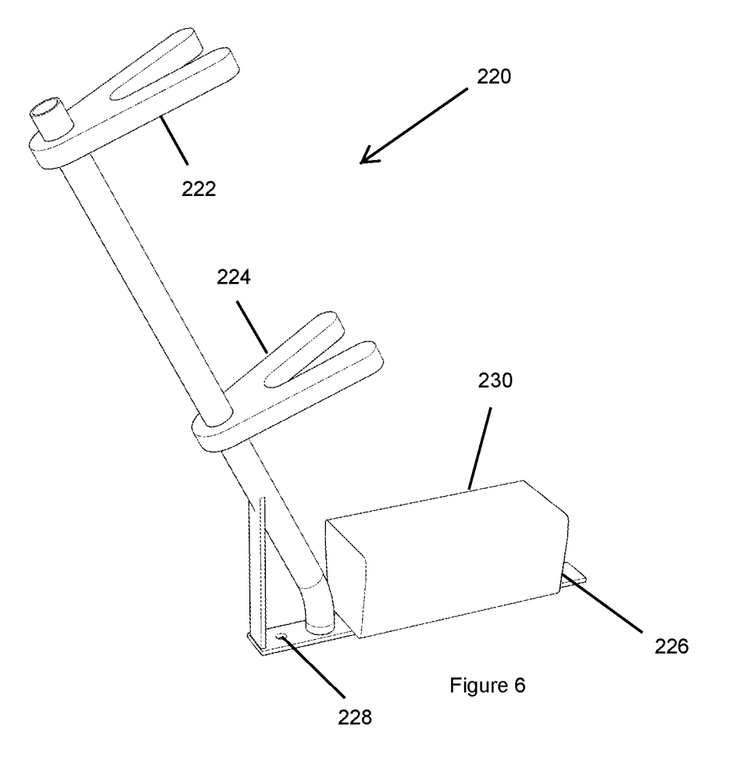
FIG. 6 illustrates a side perspective view of an implementation of a tool exchange system for mounting a rifle to a front bumper of a UTV according to the present disclosure.

The front bumper 100 may further comprise one or more tool exchange receivers 140, such as a first tool exchange receiver 140 with ports 142, 144 and a second tool exchange receiver 140 with ports 146, 148, as described in greater detail herein with respect to FIGS. 5 and 6. In an implementation, the tool exchange ports 142, 144, 146 and 148 are formed from 2-inch outer diameter DOM structural tubing.

In an implementation, the cargo platform 110, the rail 120, the back band 126 and the tool exchange receiver ports 142, 144, 146 and 148 are all placed on a "welding jig" and welded together.

A molded rubber logo element 122 may form part of the rail 120, and/or a brush guard 124 may be coupled to the rail 120. The molded rubber logo element 120 is operable to push objects without damaging the paint on the rail 120 or the object being pushed. The overall shape of the platform 110 and rail 120 may follow the shape of the front of the UTV and/or to facilitate movement of the UTV through brush.

The front bumper 100 may include a coupling system 130 to couple the front bumper 100 to the UTV. The coupling system 130 may connect the front bumper 100 to standard features of the UTV without modifying the UTV. In particular, the coupling system 130 may couple the front bumper 100 to factory mounting points on the UTV, such as where the factory front bumper attached, if applicable.

In some implementations, the coupling system 130 includes a first mounting plate 132 that is laser cut using universal mounting holes and a second mounting plate 134 formed by measuring mounting points on the UTV, putting those measured mounting points into a CAD program, and laser cutting the second mounting plate 134. These two mounting plates 132, 134 may then be connected using structural steel to create an interface to connect the front bumper 100 to the UTV.

A skid plate 135 may be positioned below and engage the platform 110 to provide support and stability to the front bumper 100 while carrying cargo and/or during operation of the UTV. The skid plate 135 is also operable to protect the front of the UTV during operation. In an implementation, the skid plate 135 is formed from 11-gauge aluminum and is laser cut and broken on a large press.

In an implementation, the front bumper 100 is formed primarily of steel and aluminum and adds approximately 60 pounds to the front of a UTV. In an implementation, the front bumper 100 protrudes approximately 20-inches from the front of the UTV. Field tests have confirmed that adding the front bumper 100 to a UTV does not impede the UTV's climbing performance. However, driving adjustments may be required when turning so as to miss objects in front of the UTV given the protrusion of the front bumper 100.

Figure 3:
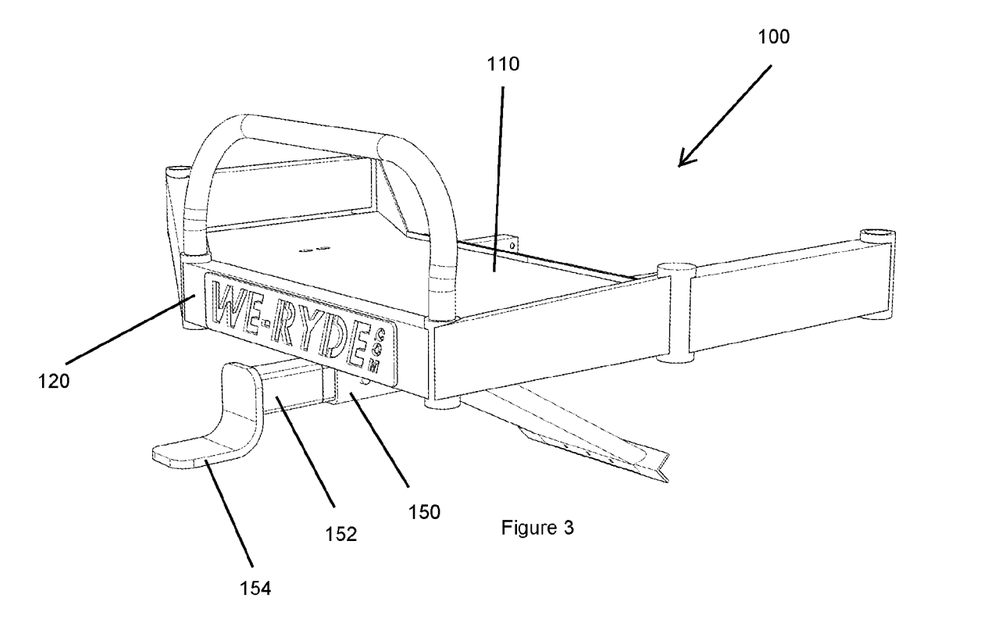
FIG. 3 illustrates a side perspective view of an implementation of a front bumper for a UTV equipped with a receiver hitch according to the present disclosure.
Figure 4:
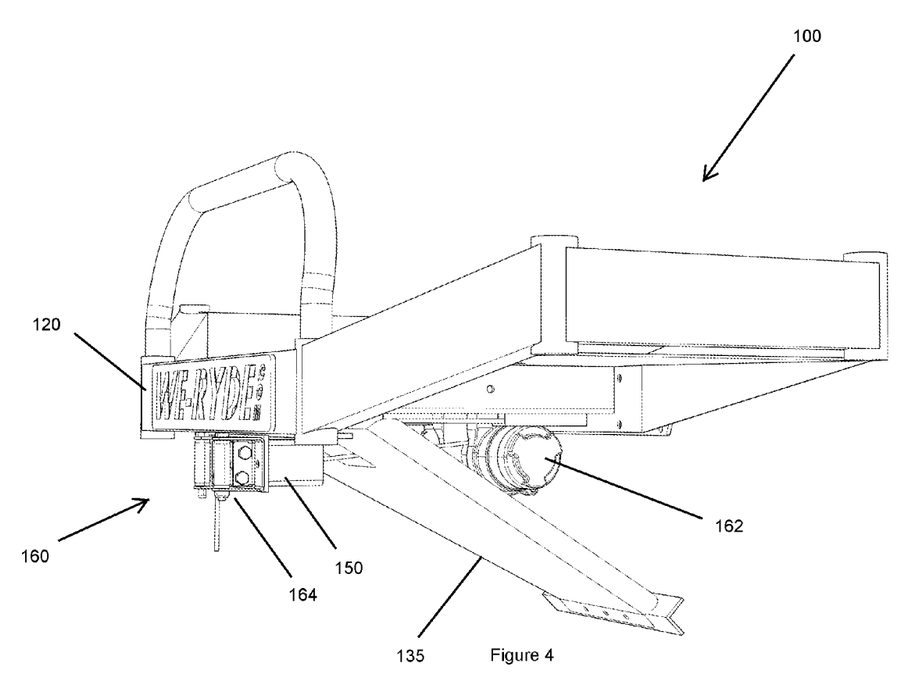
FIG. 4 illustrates a side perspective view of an implementation of a front bumper for a UTV equipped with a winch and a roller fairlead for the winch according to the present disclosure.

Referring now to FIGS. 3 and 4, in various embodiments, different types of optional equipment may be coupled to the front bumper 100. For example, FIG. 3 and FIG. 4 both depict a receiver hitch 150 that may be connected to the bottom of the cargo platform 110. In an implementation, the receiver hitch 150 is formed from 3/16-inch thick steel, 2-inch by 2-inch square tubing.

In FIG. 3, a standard hitch 152 with a 45-degree adapter 154 is shown inserted into the receiver hitch 150 and extending beyond the rail 120 of the front bumper 100. The standard hitch 152 (with adapter 154) is operable to fit into a car or truck so that the user can move small trailers around. In an implementation, the 45-degree adapter 154 is removable to provide maximum clearance from the bottom of the front bumper 100 to the ground.

FIG. 4 depicts a winch system 160 comprising a motor-driven drive train 162 coupled to the bottom of the platform 110 and positioned behind the skid plate 135, and a roller fairlead 164 coupled to the receiver hitch 150 below the front rail 120. The roller fairlead 164 controls the feeding of the cable of the winch system 160.

Referring again to FIG. 1, the front bumper 100 may further comprise one or more tool exchange receivers 140, such as a first tool exchange receiver 140 with ports 142, 144 and a second tool exchange receiver 140 with ports 146, 148. The ports 142, 144, 146, 148 are designed to receive connectors when a tool exchange system is connected thereto. Any or all of the ports 142, 144, 146, 148 may be covered with a cap, such as the cap shown covering port 144 in FIG. 1, when not in use.

FIGS. 5 and 6 depict two different types of tool exchange systems 210, 220 that may be coupled to the tool exchange receivers 140 of the front bumper 100.

FIG. 5 depicts a tool exchange system 210 for mounting a chainsaw to the front bumper 100. The tool exchange system 210 comprises a base 216 for supporting the body of the chainsaw and a v-bar 218 for supporting the chain of the chainsaw. The tool exchange system 210 further comprises mounting holes 212, 214 that correspond to ports 142, 144 on the tool exchange receivers 140 of the front bumper 100 as shown in FIG. 1. The mounting holes 212, 214 and ports 142, 144 are designed to receive connectors for coupling the tool exchange system 210 to the tool exchange receiver 140.

FIG. 6 depicts a tool exchange system 220 for mounting a rifle to the front bumper 100. The tool exchange system 220 comprises two v-shaped guides 222, 224 for supporting the barrel of the rifle. An ammunition box 230 may be coupled to the tool exchange system 220, such that the ammunition box 230 also supports the stock of the rifle. The tool exchange system 220 further comprises mounting holes 226, 228 that correspond to ports 146, 148 on the tool exchange receivers 140 of the front bumper 100 as shown in FIG. 1. The mounting holes 226, 228 and ports 146, 148 are designed to receive connectors for coupling the tool exchange system 220 to the tool exchange receiver 140.

Figure 7A:
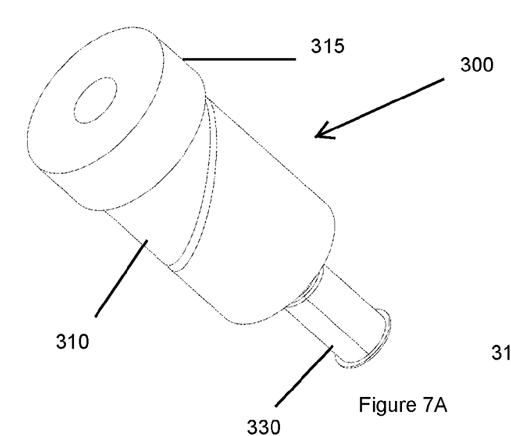
FIG. 7A illustrates an isometric perspective view of an implementation of an attachment rod with a press-fit nut coupled thereto according to the present disclosure.
Figure 7B:
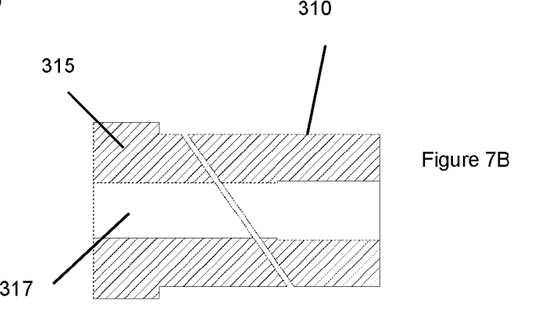
FIG. 7B illustrates a cross-sectional side view and a top view of the attachment rod of FIG. 7A according to the present disclosure.
Figure 7C:
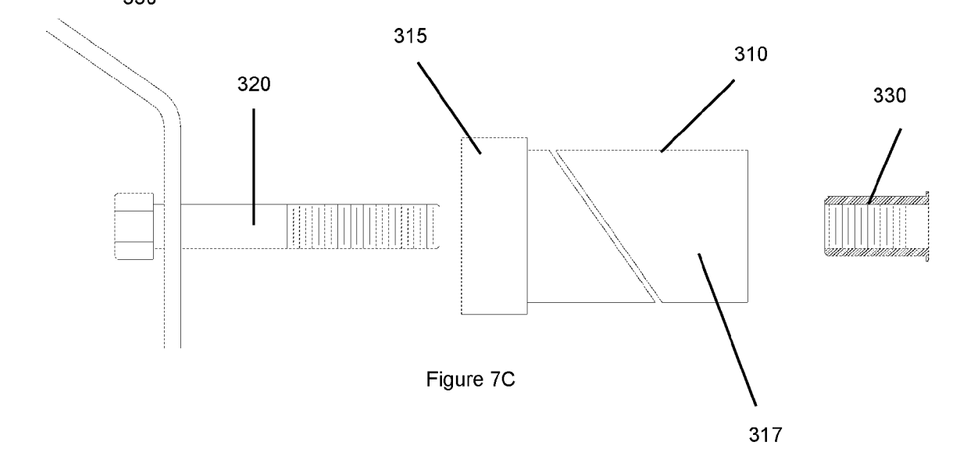
FIG. 7C illustrates a cross-sectional side view of the attachment rod of FIG. 7A with a bolt and a press-fit nut according to the present disclosure.

FIGS. 7A through 7C depict a representative attachment rod 300 with a bolt 320 and a press fit nut 330 that may be used to couple tool exchange systems 210, 220 to the front bumper 100. In particular, attachment rods 300 may be placed through the mounting holes 212, 214, 226, 228 of the tool exchange systems 210, 220 and into corresponding ports 142, 144, 146, 148 of the tool exchange receivers 140. Then each attachment rod 300 may be tightened into frictional engagement with the ports 142, 144, 146, 148 using the bolt 320 and press-fit nut 330.

In an implementation, the attachment rods 300 may comprise a rod body 310, a rod head 315 and an aperture 317 extending therethrough. The attachment rods 300 may be custom-made nylon rods turned down on a lathe to form an angled cut in the rod body 310. In an implementation, such attachment rods are formed by starting with a 2-inch outer diameter nylon rod, cutting it down, cutting a wedge in the bottom, and adding a bolt 320 into the aperture 317 on the rod head 315 side and a press fit nut 330 into the aperture 317 on the opposite side to create a quick tight fit. In particular, when the bolt 320 and the press fit nut 330 are disposed in the aperture 317, as the bolt 320 is turned so that the threads on the bolt 320 engage the threads on the press fit nut 330, the bolt 320 tightens down against the rod head 315, forcing the rod body 310 to expand outwardly along the angled cut into engagement with the walls of the ports 142, 144, 146, 148. Thus, the attachment rods 300 are designed to provide a "quick disconnect" by the end user to switch tool exchange systems in seconds.

In addition to the specific tool exchange systems 210, 220 that have been depicted and described, various other types of tool exchange systems are contemplated that may be designed to hold and store fishing poles, shotguns, hunter bows, ammunition, chainsaws, and many other types of equipment and tools.

Whether camping, hunting, fishing, trail riding, or working on their land, the front bumper 100 allows an end user to carry more cargo on their UTV. Moreover, the tool exchange systems of the present disclosure provides the ability to organize fishing poles to prevent them from being tangled, store guns so as not to get damaged, stow a chainsaw for transport, and otherwise provide additional space for more gear in the front bumper 100 and in the back cargo bed of the UTV.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. As another example, "coupling" includes direct and/or indirect coupling of members.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A system comprising a front bumper for a utility vehicle, the front bumper comprising:
   a cargo platform;
   a rail surrounding at least a portion of the cargo platform;
   a coupling system for coupling the front bumper to the front of the utility vehicle;
   one or more tool exchange receivers;
   a tool exchange system coupled to the one or more tool exchange receivers; and
   an attachment rod, a bolt, and a press nut coupling the tool exchange system to the one or more tool exchange receivers;
   wherein the attachment rod comprises: a rod body, a rod head, and an aperture therethrough; and
   wherein a first end of the aperture receives the bolt and a second end of the aperture receives the press nut when coupling the tool exchange system to the one or more tool exchange receivers.

2. The system of claim 1, wherein the coupling system is adapted to couple the front bumper to factory mounting points on the utility vehicle without modifying the utility vehicle.

3. The system of claim 1, wherein a front surface of the cargo platform follows the shape of the front of the utility vehicle.

4. The system of claim 1, the front bumper further comprising:
   one or more tie-down holes for receiving straps to connect cargo to the cargo platform.

5. The system of claim 1, the front bumper further comprising:
   one or more wash out slots disposed between the cargo platform and the rail.

6. The system of claim 1, further comprising:
   a hitch coupled to the front bumper.

7. The system of claim 1, further comprising:
   a skid plate supporting the front bumper.

8. The system of claim 1, further comprising:
   a winch system coupled to the front bumper.

9. The system of claim 1, wherein the tool exchange system is adapted to hold one of a gun, a fishing pole, and a chainsaw on the front bumper.

10. The system of claim 1, wherein the tool exchange system comprises:
    a base for supporting the body of a tool; and
    a v-bar for supporting a portion of the tool that extends from the body.

11. The system of claim 1, wherein the tool exchange system comprises: a v-shaped guide for supporting the barrel of a gun.

12. A system comprising a front bumper for a utility vehicle, the front bumper comprising:
    a cargo platform;
    a rail surrounding at least a portion of the cargo platform;
    a tool exchange receiver; and
    a tool exchange system coupled to the tool exchange receiver via an attachment rod, a bolt, and a press nut;
    wherein the attachment rod comprises: a rod body, a rod head, and an aperture therethrough; and
    wherein a first end of the aperture receives the bolt and a second end of the aperture receives the press nut when coupling the tool exchange system to the tool exchange receiver.

13. The system of claim 12, wherein the tool exchange system is adapted to hold one of a gun, a fishing pole, and a chainsaw on the front bumper.

14. The system of claim 12, further comprising:
    at least one of a hitch or a winch system coupled to the front bumper.

15. A system comprising a front bumper for a utility vehicle, the front bumper comprising:
    a cargo platform;
    a rail surrounding at least a portion of the cargo platform;
    a tool exchange system coupled to the front bumper via an attachment rod, a bolt, and a press nut;
    wherein the attachment rod comprises: a rod body, a rod head, and an aperture therethrough; and
    wherein a first end of the aperture receives the bolt and a second end of the aperture receives the press nut when coupling the tool exchange system to the front bumper.

* * * * *